United States Patent
Furuya et al.

(10) Patent No.: US 6,551,719 B2
(45) Date of Patent: Apr. 22, 2003

(54) REACTION VESSEL OF OXIDIZATION AND DECOMPOSITION PROCESSING EQUIPMENT BY SUPERCRITICAL WATER AND METHOD FOR MANUFACTURING THE SAME

(75) Inventors: Takahito Furuya, Tokyo (JP); Takayuki Shimamune, Tokyo (JP)

(73) Assignee: Furuyametal Co., Ltd., Tokyo (JP)

( * ) Notice: Subject to any disclaimer, the term of this patent is extended or adjusted under 35 U.S.C. 154(b) by 76 days.

(21) Appl. No.: 09/742,668

(22) Filed: Dec. 20, 2000

(65) Prior Publication Data

US 2001/0022206 A1 Sep. 20, 2001

(30) Foreign Application Priority Data

Dec. 20, 1999 (JP) ............................... 11-361692

(51) Int. Cl.$^7$ ............................... B32B 15/04
(52) U.S. Cl. ................ 428/469; 422/241; 428/545; 428/697; 428/702
(58) Field of Search ................ 428/469, 697, 428/702, 545; 75/232, 234, 245, 246, 247; 422/241

(56) References Cited

U.S. PATENT DOCUMENTS 4,082,900 A * 4/1978 Shimogori et al. ......... 428/469
4,297,150 A    10/1981 Foster et al. ............... 148/276
5,527,471 A     6/1996 Hong et al. ................ 210/761
5,591,415 A     1/1997 Dassel et al. .............. 422/241

OTHER PUBLICATIONS

Kane R.D., Pick the Right Materials for Wet Oxidation, Chemical Engineering Progress, AICE, vol. 95, No. 3 (Mar. 1999), pp. 51–58.
Database WPI, Section CH, Week 197831—Derwent Publications Ltd., London, G.B.; AN 1978–5605A. XP002186688 & JP 53 073478 A (Japan Carlit Co. Ltd.) Jun. 29, 1978 *Abstract*.
Patent Abstracts of Japan, vol. 1995, No. 02, Mar. 31, 1995 & JP 06 322524 A (Hitachi Ltd.), Nov. 22, 1994 *Abstract*.

\* cited by examiner

Primary Examiner—Robert R. Koehler
(74) Attorney, Agent, or Firm—Darby & Darby

(57) ABSTRACT

Disclosed is a reaction vessel used for oxidizing and decomposing equipment suitable for processing with supercritical water, and methods of manufacturing the reaction vessel. The reaction vessel comprises an oxide film containing a platinum group metal oxide for example having a fine crystalline structure, and a high corrosion resistance in both oxidizing and reducing atmosphere. The film is formed on a surface of the vessel by performing a pyrolysis reaction in an atmosphere containing water vapor. The oxide film is comprised of at least one platinum group metal oxide selected from Ir, Ru or Rh oxide, and at least one oxide of a metal selected from Ti and Ta.

12 Claims, 1 Drawing Sheet

US 6,551,719 B2

REACTION VESSEL OF OXIDIZATION AND DECOMPOSITION PROCESSING EQUIPMENT BY SUPERCRITICAL WATER AND METHOD FOR MANUFACTURING THE SAME

BACKGROUND OF THE INVENTION

1. Field of the Invention

This invention relates to a reaction vessel for the use of oxidization and decomposition processing equipment by supercritical water and a method of manufacturing the reaction vessel in which harmful substances such as polybiphenyl chloride (hereinafter called as PBC), powerful toxic dioxine and other organic compounds are processed to be their non-toxic states through oxidization and decomposition under supercritical water condition with its critical temperature being 374° C. or higher and its critical pressure being 22 MPa or higher.

2. Description of the Related Art

In recent years, a chemical processing has been carried out frequently under a supercritical state. For example, coffee and the like are mainly used in extraction of food or separation of chemical products and the like under a supercritical $CO_2$ where the processing is carried out under a relatively low temperature, In the case of supercritical water, although its original substance is water, there have been provided many cases that the supercritical water is used in a normal chemical reaction and oxidization such as treatment of environmental-relating materials such as decomposition of PCB, dioxine and the like due to the fact that its critical temperature is quite high, for example, the critical temperature is 374° C. or higher and the critical pressure is 22 MPa or higher.

These treatments are mainly carried out such that the materials are dissolved with water under supercritical state as solvent, then they are reacted with oxygen and decomposed. That is, since the supercritical water is liquid and at the same time it has also a characteristic acting as gas, where reaction with oxygen as gas must be almost freely carried out.

That is, since the supercritical water is liquid and at the same time reaction with oxygen as gas can be carried out almost freely, the aforesaid materials can be quite easily dissolved due to the fact that the supercritical water becomes water of low molecules and dispersed water which is different from the usual water, resulting in that the materials and oxygen can be almost freely merged and reacted to each other under such a processing condition as above and so its oxidization and decomposition can be easily carried out.

SUMMARY OF THE INVENTION

However, in the case of the reaction vessel where such a strong reaction is performed, it occurred frequently the materials is generally exposed to the quite strong oxidizing atmosphere and at the same time in the case of decomposition of harmful substances such as dioxine and the like, the substances are completely decomposed, and resulting that Cl component becomes hydrochloric acid which show strong acid and the resulting liquid gives a strong corrosive characteristic and the reaction vessel itself is corroded.

Then, in the case of the prior art, reaction vessel used in the oxidization and decomposition treatment equipment of supercritical water performing such a reaction as above, Ni-based alloy material is normally used, although it is not possible to say that this Ni-based alloy material has a sufficient anti-corrosive characteristic in its chemical stability against acid-corrosion and therefore either replacement work caused by the acid-corrosion or maintenance work such as a repairing operation must be performed within a short period of time, which must give a problem to require high running cost and the improvement has been highly requested.

In view of the foregoing, as a countermeasure for the resolution against these problems, it has been tried that the inner surface of the reaction vessel is covered by anti-corrosive substances such as by Pt plating or the like. But Pt is expensive, and not only a sufficient anti-corrosive performance could not be obtained, but also there occurred a problem of a peeling-off of the Pt plated film and the like caused by a difference of thermal expansion coefficient in respect to the reaction vessel (Ni-based alloy) accompanied by rapid increasing or rapid decreasing in temperature. In addition, although the Pt is durable against the acid atmosphere, the Pt shows a problem of crystal growth and peeling-off or destruction of it in reducing atmosphere, so that actually it can not be applied in such a objectives.

In view of such a circumstance as found in the prior art, the present inventor made a various investigation to the subject matter and reached the present invention, wherein the objectives of the present invention is to enable the reaction vessel to be covered and to be protected against corrosive atmosphere in both oxidizing and reducing atmosphere and to provide a reaction vessel applicable in an oxidization and decomposing processing equipment by supercritical water and a method of manufacturing the reaction vessel in which its durability is remarkably improved and its continuous use can be performed for a long period of time.

In order to solve the problem, the present invention provides a reaction vessel applied in an oxidizing and decomposing processing equipment by supercritical water, wherein an oxide film containing metal oxide having a quite high anti-corrosive characteristic in both oxidizing and reducing atmosphere is formed at an inner surface of the vessel main body and the vessel is covered with the oxide film and protected by it. In this case, as the type of the reaction vessel structure, that is, any of a vertical cylindrical vessel type or a coil type can be applied.

In addition, the present invention provides the aforesaid reaction vessel in which the oxide film contains platinum group metal oxides composed of fine crystalline structure showing a quite high anti-corrosive characteristic in both oxidizing and reducing atmosphere.

In additions the present invention provides a reaction vessel in which an oxide film contains at least one platinum group metal oxide selected from Ir, Ru, and Rh.

In addition, the present invention provides a reaction vessel in which an oxide film is comprised of a composite oxides containing platinum group metals and at least one metal selected from Ti, Ta.

In addition, the present invention provides a reaction vessel in which an oxide film is comprised of a composite oxide containing Ir, and at least one kind selected from Ti, and Ta by 20 to 50 at %, or a composite oxides containing Ru, and at least one kind selected from Ti, and Ta by 30 to 70 at %.

In addition, the present invention provides a method of manufacturing a reaction vessel used in a equipment for oxidizing and decomposing operations by supercritical water, wherein after coating solution composed of salt solution containing platinum group metals is applied to a surface of a vessel main body, the vessel main body is processed with pyrolytic reaction processing under atmosphere containing aqueous moisture, thereby an oxide film containing platinum group metal compound composed of fine crystalline structures having a quite high anti-corrosive characteristic in both oxidizing and reducing atmosphere is formed at the inner surface of the vessel main body.

In addition, the present invention provides a method of manufacturing the aforesaid reaction vessel, wherein after performing a pretreatment in which the surface of the vessel main body is degreased, its surface is processed with heat and said surface is formed with an oxide layer in advance, the coating solution is applied to coat it.

In addition, the present invention provides a method of manufacturing a reaction vessel, wherein an oxide film is comprised of a composite oxide containing Ir, at least one kind selected from Ti, and Ta by 20 to 50 at % or a composite oxide containing Ru, at least one kind selected from Ti, and Ta by 30 to 70 at %.

In addition, the present invention provides a method of manufacturing a reaction vessel, wherein salt solution contains platinum group metal chloride, or alkoxide compound of platinum group metals.

Thus, in accordance with the aforesaid technical means, the reaction vessel showing the largest wear in the equipment for oxidizing and decomposing processing with supercritical water is covered and protected by an oxide film formed at the surface of the reaction vessel containing metallic compound having a quite high anti-corrosive characteristic in both oxidizing and reducing atmosphere, for example, an oxide film containing platinum group metal oxide composed of fine crystals, thereby the reaction vessel is exposed in both oxidizing and reducing atmosphere at high temperature and high pressure for a long period of time and its acid-based corrosion caused by reactant is restricted even under a severe environment such as heating and rapid cooling states. With such an arrangement as above, it becomes possible to make a rapid progress of anti-corrosive characteristic and durability of the reaction vessel and a substantial improvement of its practical application. In other words, it becomes possible to make a substantial reduction of running cost accompanied by either replacement or repairing of the reaction vessel and make a substantial improvement in its practical application.

DESCRIPTION OF THE PREFERRED EMBODIMENT(S)

A preferred embodiment of the present invention is described as follows.

Figure 1A:
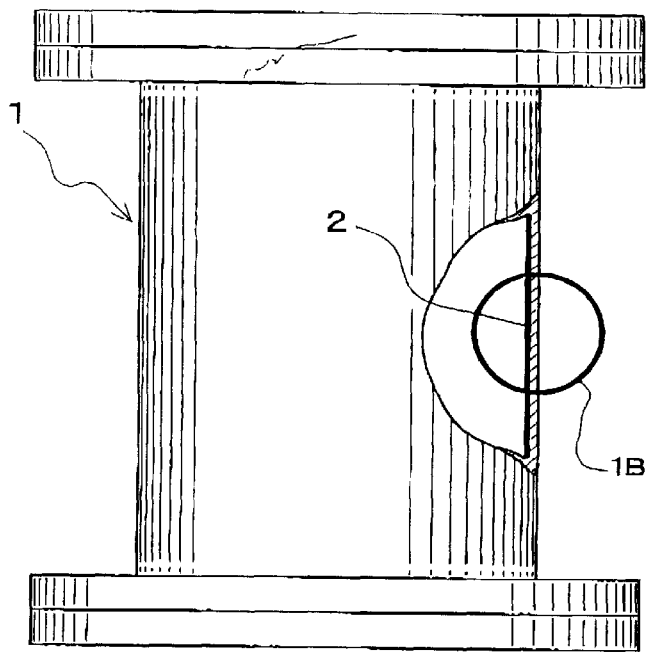
FIG. 1 is a front elevation showing one example of a preferred embodiment of the reaction vessel of the present invention (FIG. 1A) with a part being shown by a cross section view (FIG. 1B)
Figure 1B:
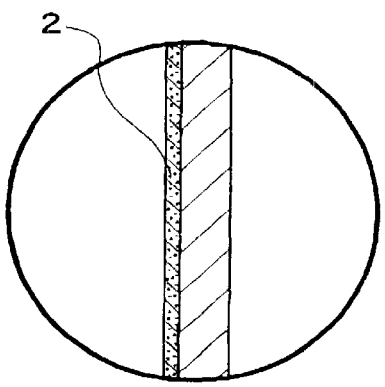

The vessel main body 1 is made of Ni-based alloy normally applied in the art, forms a well-known structure showing a vertical cylindrical vessel type or a coil-type form (the vessel type is shown in the figure), wherein an oxide film containing metal oxide composed of crystalline structure having a quite high anti-corrosive characteristic in both oxidizing and reducing atmosphere, for example, an oxide film 2 containing platinum group metal oxide is formed at an inner surface of the vessel main body by performing a pyrolysis decomposing reaction in atmosphere containing water vapor (refer to the enlarged view of FIG. 1). In this way, the inner surface of the vessel main body 1 is covered and protected by the oxide film 2, its anti-corrosive characteristic against acid becomes quite high even in the case that the reaction product shows a strong acid characteristic, resulting in that its durability makes a remarkable progress.

Although not shown, in the case that the vessel main body is of a vessel type, it is of course apparent to say that it contains surrounding pipes or the like in addition to the vessel itself.

In the present invention, when the oxide film 2 formed at the inner surface of the vessel main body 1 is comprised of Ir—Ta based composite oxides as indicated in Table 1, it is important in view of accomplishing the present invention that an amount of content of Ta is restricted in a range of 20 to 50 at %.

A reason why this setting range is applied consists in the fact that if the amount of content of Ta is 20 at % or less, it becomes a uniform rutile type oxide under pyrolysis reactions although a relative large crack may easily be produced at a layer of the oxide film 2, and if the amount of content of Ta exceeds 50 at %, amorphous or crystalline separated phase of oxide tantalum in addition to stable rutile oxide is produced, though depending on a manufacturing condition of the reaction vessel, resulting in that the crack may easily be produced at the layer of the oxide film 2.

As described above, in the case that the oxide film 2 composed of Ir—Ta based composite oxides is formed at the inner surface of the vessel main body 1 by a pyrolysis process, it becomes important to restrict the amount of content of Ta within a range of 20 to 50 at %.

In the present invention, when the oxide film 2 formed at the inner surface of the vessel main body 1 is comprised of Ru—Ti based composite oxides as indicated in Table 2, it is important in view of accomplishing the present invention that an amount of content of Ti is restricted in a range of 30 to 70 at %.

A reason why this setting range is applied consists in the fact that if the amount of content of Ti is 30 at % or less, although the pyrolysis reaction may produce a uniform rutile-type oxide having titanium oxide solid soluted with ruthenium oxide, not apparent, a relative large crack may easily be produced at a layer of the oxide film 2, and if the amount of content of Ti exceeds 70 at %, anatase phase is produced in addition to rutile phase and the layer of the oxide film 2 is not made uniform.

As described above, in the case that the oxide film 2 composed of Ru—Ti based composite oxides is formed at the inner surface of the vessel main body 1 by a pyrolysis process, it becomes important to restrict the amount of content of Ti within a range of 30 to 70 at %.

Next, a method of manufacturing the vessel main body 1, i.e. a preferred manufacturing method of forming the oxide film 2 at the inner surface of the vessel main body 1 is described as follows, wherein the Ni-based alloy of the vessel main body 1 acting as a base material is activated in advance, coating solution composed of salt solution containing platinum group metals is uniformly coated on the surface of it, thereafter it is processed with a pyrolysis method in atmosphere containing water vapor having its condition defined.

Although the surface treatment of the vessel main body 1 is not specifically limited, it is preferable to avoid the rough surface formation at the surface and it is desirable to apply a degreasing process and an oxide forming process with surface heating process. A reason why these processes are applied consists in the fact that the pre-forming of the oxide layer 3 improves an anti-corrosiveness of the vessel main body 1 itself and further its bonding with the oxide film 2 can be increased more. Then, although the formation of the oxide layer 3 to the inner surface of the vessel main body 1 is not specifically limited, it can be carried out by a heat treatment of the vessel main body 1 in the air atmosphere. This processing can be carried out with its temperature during this process being in a range of about 500 to 700° C. and further it can be performed in a range of about 600 to 900° C. in the water vapor atmosphere, where saturated with water vapor. With this arrangement above, it is possible to produce oxide layer 3 of quite dense and having a high adhering characteristic at the inner surface of the vessel main body 1.

Figure 2:
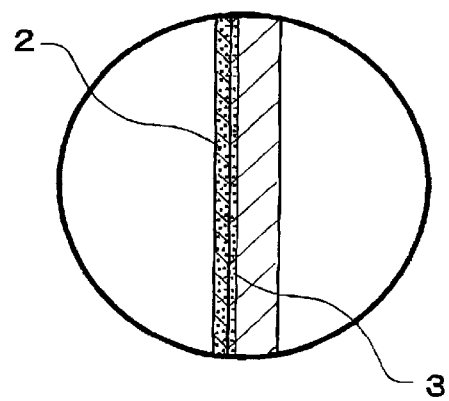
FIG. 2 is an enlarged view showing a substantial part of another preferred embodiment of the reaction vessel of the present invention.

In this way, the oxide film 2 containing platinum group metal compound is formed at the inner surface of the vessel main body 1 formed with oxide layer 3 after performing a pre-treatment (refer to FIG. 2).

As platinum group metals forming the oxide film 2, it is desirable to apply at least one kind selected from Ir, Ru, and Rh having a superior anti-corrosive characteristic or these composite oxides and further to apply a composite oxides containing at least one kind selected from Ti, and Ta as stabilizing agent.

Then, the oxide film 2 can he obtained by applying coating solution composed of aqueous solution containing salt or salt solution such as alcoholic solution and the like to the inner surface of the vessel main body 1 and drying it, thereafter a pyrolysis reaction processing with forced heating is performed with a temperature ranging from 350 to 700° C. in oxidizing atmosphere.

In this case, as salt solution, although it is possible to apply platinum group metal chloride, or alkoxide compound of platinum group metals, it is preferable to avoid use of chloride that is apt to make a direct corrosion of the vessel main body 1 acting as the base material.

Further, in the case of using chloride, it is necessary to make an amount of content of chlorine minimum. That is, in the case that Ir chloride acid, Ru chloride acid and/or Rh chloride are used as raw material of platinum group metals, these chlorides are dissolved in advance in alcohol such as amyl alcohol and the like, heated and dry distillated by a dry distillation equipment provided with a condenser and it is desirable to use material in which at least a part of Cl component is replaced with alcohol base. In this case, although this is different in response to a processing time, the Cl component of 50 to 70% is replaced with alcohol base through processing of 5 to 10 hours.

The salt processed in this way is dissolved in alcohol such as isopropyl alcohol or butyl alcohol and the like or water to form coating solution for oxide film.

Then, it is desirable that as Ti or Ta, chloride is not used, but metal alkoxide such as butyl titanate or butyl tantalate and the like.

The coating solution for oxide film manufactured in this way is applied to the inner surface of the vessel main body 1 acting as a base material, although its coating method is not restricted in particular, and it is important that the coating is applied as uniform as possible without any irregular surface.

Normally, this is coated with a brush or spray coating and the like, thereafter the coated surface is naturally dried at a room temperature. Further, as required, a forced drying is carried out at a higher temperature of about 110° C. After drying it in this way, a pyrolysis reaction processing is carried out, although the oxide film 2 composed of fine crystalline structure having a quite high anti-corrosive characteristic can be formed at the inner surface of the vessel main body 1 in both oxidizing and reducing atmosphere by performing the pyrolysis reaction processing in the water vapor atmosphere, where saturated with water vapor in a temperature range of 400 to 700° C. Although the pyrolysis processing time is not limited at this time, it is preferably in a range of about 10 to 15 minutes.

In addition, in the case that the oxide film 2 is formed, performing of a pyrolysis reaction in the atmosphere containing water vapor therein causes the residual chlorine to be removed and concurrently the layer of the oxide film 2 to be unified and further a fine oxide layer to be attained. That is, it is possible to form the layer of the oxide film 2 composed of oxide layer of fine crystalline structure showing a quite high corrosion resistance characteristic in both oxidizing and reducing atmosphere at the inner surface of the vessel main body 1.

In additions in the case that the oxide film 2 is formed, it is desired that a thickness (nm) of the film under a pyrolysis reaction is about 100 to 300 as an amount of one time coating of the coating solution and further this is repeated from several times to ten times or so, or as required further this is repeated by several times and it is preferable that the oxide film 2 having a predetermined film thickness (nm) is formed.

A reason why this is formed consists in the fact that when a film thickness per one time is made thick, it may generate a problem that the fine oxide film 2 is hardly formed and a porous surface is easily attained. In addition, since it can be considered that volatile substance is replaced with oxygen while being volatized under pyrolysis reaction processing and becomes oxide and the oxide film 2 is easily made porous due to these volatile substances, resulting in that the aforesaid coating→drying→pyrolysis reaction operation are repeated to enable the oxide film 2 composed of fine oxide layer of fine crystalline structure having a quite high corrosion resistance characteristic in both oxidizing and reducing atmosphere to be formed at the inner surface of the vessel main body 1.

Further, in the case that salt not containing any Cl component at all is applied as a raw material, the pyrolysis processing is not carried out in atmosphere containing water vapor, but carried out in air atmosphere. However, it is desirable to perform it in the atmosphere containing water vapor in order to form the oxide film 2 composed of fine oxide layer as described above at the inner surface of the vessel main body 1.

The oxide film 2 formed at the inner surface of the vessel main body 1 in this way is comprised of an oxide layer having fine crystalline structure that has a quite high corrosion resistance characteristic in both oxidizing and reducing atmosphere and further the oxide film 2 is comprised of these assemblies. Then, a slight number of through-pass holes are scattered and left at the oxide film 2 formed by the aforesaid pyrolysis reaction processing and the presence of these through-pass holes may prevent the oxide film 2 from being broken caused by a difference in thermal expansion (a difference in elongation or shrinkage between the vessel and the film) accompanied by rapid increasing or decreasing of the vessel main body 1 and further prevent the film from being peeled off.

Accordingly, in the present invention, it is important that the oxide film 2 having some through-pass holes scattered therein is formed (produced).

It is satisfactory that a selection of material about platinum group metals forming the oxide film 2 is determined in response to a condition under supercritical state. If it is high, Ir is preferable and it is desirable to apply complex material containing Ta of about 20 to 50 at % as stabilizing agent against Ir in particular. With such an arrangement as above, the oxide film 2 becomes more dense.

Further, as to Ru, since a crystallization temperature of the oxide is low, its forming (production) is easily attained. However, Cl component is easily left in it, a certain care is required when it is practically used.

EXAMPLE 1

A vertical cylindrical vessel type reaction vessel (its volume is 100 ml) made of Ni alloy was used and the oxide film 2 with an apparent film thickness of 3000 nm composed of Ir −20 to 50 at % Ta was formed at the inner surface thereof through thin film formation process divided into several times in operation (coating→drying→pyrolysis reaction operation).

In this case, as Ir raw material, Ir chloride $IrCl_3$ was used and as Ta raw material, butyltantalate $(Ta(C_3H_7O)_5)$ was used. Ir chloride was dissolved in amyl alcohol, put into a heating and distillation equipment provided with a circulator and its circulation flow was continued for ten hours at a temperature of 90° C. With this processing, a part of Cl component of Ir chloride was replaced with amyl alcohol and the Cl component of about ¾ was removed. Butyltantalate was added to this Ir raw material liquid to produce coating solution for the oxide film 2.

In addition, after the inner surface of the reaction vessel was degreased with aceton (cleaning solution), the processing was carried out for 1 hour in the flow of water vapor of 700° C. to generate Ni oxide at the inner surface of the reaction vessel. Then, coating solution was applied to the inner surface of this Ni oxide and automatically dried at a room temperature (approximately 25° C.), thereafter it was forcedly dried at 110° C. and further the pyrolysis reaction processing was carried out for 10 minutes in atmosphere containing water vapor of 700° C. This coating→drying→pyrolysis reaction operation was repeated by ten times to form the oxide film 2 with an apparent film thickness of 3000 nm at the inner surface of the vessel main body 1.

A surface state of the oxide film 2 having a composition range of Ir −20 to 50 at % Ta formed at the inner surface of the vessel main body 1 was observed with a practical microscope. In addition, a flat plate-like species made concurrently at this time (a test piece thickness: 1 mm) was checked for a crystalline phase of the oxide film 2 by an X-ray diffraction method.

Further, a durability test of heating and quenching was carried out in a temperature range from a room temperature (approximately 25° C.) to 650° C. Each of the temperature increasing (heating) time and temperature decreasing (quenching) time was set to 3 minutes, respectively.

Under an assumption of processing decomposed produced materials such as PCB or dioxine and the like, a corrosion resistance test was carried out in which pure water containing hydrochloric acid (HCl) of 1000 pmm was put and held for 10 hours under a supercritical state with a critical temperature of 650° and a critical pressure of 25 MPa. Then, as an example of comparison, a similar corrosion resistance test was carried out under application of the vessel type reaction vessel (usual product) made of Ni having no oxide film formed therein. The result of this test is indicated in Table 1.

TABLE 1

| Item | 1 | 2 | 3 | 4 | 5 | 6 | 7 | 8 |
|---|---|---|---|---|---|---|---|---|
| Material composition (at %) | | | | | | | | |
| Ir | 90 | 80 | 70 | 60 | 50 | 40 | 20 | 10 |
| Ta | 10 | 20 | 30 | 40 | 50 | 60 | 80 | 90 |
| Film crystalline phase | Rutile $IrO_2$ | Rutile $IrO_2$ | Rutile | Rutile | Rutile | Rutile $Ta_2O_5$ | Rutile $Ta_2O_5$ | Rutile $Ta_2O_5$ |
| Surface state | Slight crack | Smooth | Smooth | Smooth | Smooth | Slight porous | Slight porous | Slight porous |
| Heating and cooling test | No peeling | No peeling | No peeling | No peeling | No peeling | No peeling | No peeling | No peeling |
| Corrosion resistance test (immersed in HCl) | Slight corrosion | No corrosion | No corrosion | No corrosion | No corrosion | Slight corrosion | Slight corrosion | Slight corrosion |

As apparent from Table 1, a smooth surface having no cracks at all was confirmed even in a composition range of Ir −20 to 50 at % Ta. It was found that the crystalline layer was of rutile type and its crystallite size was 100 nm. Further, even if the heating and cooling were repeated, no peeling was confirmed at all to the oxide film 2.

In addition, the corrosion resistance test also showed that variation such as corrosion or the like was not found at all at the reaction vessel of the present invention formed with the oxide film 2. In turn, it was confirmed that the reaction vessel of the prior art applied in the example of comparison was remarkably corroded.

Further, the reaction vessel of the present invention covered and protected by the oxide film 2 was applied, air was used as reaction gas, aqueous solution containing PCB of 5000 ppm was used as processing liquid and PCB was oxidized and decomposed under a supercritical state with a critical temperature of 650° C. and a critical pressure of 25 MPa, resulting in that it was confirmed that PCB was oxidized and decomposed substantially in a complete state and made non-polluted. At this time, corrosion at the reaction vessel was not found at all, peeling-off of the oxide film 2 was not found at all either, resulting in that it was confirmed that its durability was remarkably improved and increased.

EXAMPLE 2

A reaction vessel similar to that described in detail in the example 1 was used, and the oxide film 2 with an apparent film thickness of 2500 nm composed of Ru −30 to 70 at % Ti was formed at the inner surface thereof through thin film formation process divided into several times in operation. (coating→drying→pyrolysis reaction operation).

In this case, after the inner surface of the reaction vessel was degreased with aceton (cleaning solution), isopropyl alcohol solution of Rh chloride was applied as coating solution to the inner surface, the coating solution was applied by a brush and automatically dried at a room temperature (approximately 25° C.), thereafter moisture and free chlorine were dispersed at 180° C. Then, the pyrolysis reaction processing was carried out for 10 minutes in atmosphere containing water vapor of 650° C. This coating→drying→pyrolysis reaction operation was repeated by ten times to form the oxide film 2 with an apparent film thickness of 2500 nm at the inner surface of the vessel main body 1.

A surface state of the oxide film 2 having a composition range of Ru −30 to 70 at % Ti formed at the inner surface of the vessel main body 1 in this way was observed with a practical microscope. In addition, a flat plate-like species made concurrently at this time (a test piece thickness: 1 nm) was checked for a crystalline phase of the oxide film 2 through X-ray deffraction method.

Further, in order to check durability (film peeling-off or the like) of the oxide film 2, a heating and quenching test was carried out in a range of a room temperature (approximately 25° C.) to 650° C. Each of the temperature increasing (heating) time and temperature decreasing (quenching) time was set to 3 minutes, respectively.

Under an assumption of processing decomposed produced materials such as PCB or dioxine and the like, a high temperature corrosion resistance test was carried out for the oxide film 2 in which pure water containing hydrochloric acid (HCl) of 1000 ppm was put and held for 10 hours under a supercritical state with a critical temperature of 650° C. and a critical pressure of 25 MPa. Then, as an example of comparison, a similar corrosion resistance test was carried out under application of the vessel type reaction vessel made of Ni having no oxide film formed therein. The result of this test is indicated in Table 2.

at the reaction vessel of the present invention formed with the oxide film 2. In turn, it was confirmed that the reaction vessel of the prior art applied in the example of comparison was remarkably corroded similar to that described in the example 1.

EXAMPLE 3

A reaction vessel similar to that described in detail in the example 1 was used, and the oxide film 2 with an apparent film thickness of 3000 nm composed of Rh with 20 to 80 at % Ru and with Ti as tetrabutyltitanate added in the same amount (at %) as that of Ru was formed at the inner surface thereof through thin film formation process divided into several times in operation (coating→drying→pyrolysis reaction operation).

In this case, the processing was carried out in flow of water vapor of 700° C. in the same manner as that described in detail in reference to the example 1 and the inner surface of the reaction vessel was formed with Ni oxide by pyrolysis. Then, the aforesaid coating solution was applied to the inner surface of the Ni oxide and automatically dried at a room temperature (approximately 25° C.), thereafter it was forcedly dried at 110° C. Then, the pyrolysis reaction processing was carried out for 10 minutes in atmosphere containing water vapor of 600° C. mixed with water vapor by 30%. This coating→drying→pyrolysis reaction operation was repeated by ten times to form the oxide film 2 with an apparent film thickness of 3000 nm at the inner surface of the reaction vessel.

The oxide film 2 having a composition range of Rh −20 to 80 at % Ru formed at the inner surface of the vessel main body 1 in this way had a rutile type crystalline layer and Cl component was hardly detected.

In addition, even if the materials such as PCB, dioxine and the like had corrosion resistance, it was confirmed that the reaction vessel had a stable corrosion resistance in the same manner as that of the preferred embodiments 1 and 2 and its lifetime was also ten times or more as compared with that of the reaction vessel of the example of comparison where no oxide film was formed.

Since the reaction vessel of the oxidizing and decomposing processing equipment with supercritical water and the

TABLE 2

| Item | 1 | 2 | 3 | 4 | 5 | 6 | 7 | 8 |
|---|---|---|---|---|---|---|---|---|
| Material composition (at %) | | | | | | | | |
| Ru | 80 | 70 | 60 | 50 | 40 | 30 | 20 | 10 |
| Ti | 20 | 30 | 40 | 50 | 60 | 70 | 80 | 90 |
| Film crystalline phase | Rutile $RuO_2$ | Rutile $RuO_2$ | Rutile | Rutile | Rutile | Rutile | Rutile anatase | Rutile anatase |
| Surface state | Slight crack | Smooth | Smooth | Smooth | Smooth | Smooth | Slight porous | Slight porous |
| Heating and cooling test | No peeling | No peeling | No peeling | No peeling | No peeling | No peeling | No peeling | No peeling |
| Corrosion resistance test (immersed in HCl) | Slight corrosion | No corrosion | No corrosion | No corrosion | No corrosion | No corrosion | No corrosion | Slight corrosion |

As apparent from Table 2, a smooth surface having no cracks at all was confirmed even in a composition range of Ru −30 to 70 at % Ti. It was found that the crystalline phase was of rutile type and stable, and its crystallite size was 100 nm. Further, even if the heating and cooling were repeated, no peeling was confirmed at all at the oxide film 2.

In addition, the corrosion resistance test also showed that variation such as corrosion or the like was not found at all method of manufacturing the reaction vessel in accordance with the present invention are constituted as described above, they have the following actions and effects. (1) The reaction vessel, showing the largest consumption at the oxidizing and decomposing processing equipment with supercritical water, contains platinum group metal oxide having fine crystalline structure with a quite high corrosion resistance in both oxidizing and reducing atmosphere formed at its surface. For example, this is covered and protected by the oxide film composed of Ir—Ta composite oxides containing Ta of 20–50 at %, or Ru—Ti composite oxides containing Ti of 30–70 at %, so that no corrosion occur even in the atmosphere with the critical temperature and critical pressure under the condition of supercritical water, peeling-off caused by a difference in thermal expansion due to rapid increasing or decreasing in temperature is not produced and it is quite stable and a high reliability against the continuous use of long period of time can be attained. (2) Coating solution composed of salt solution is applied to coat the surface of the reaction vessel formed with the oxide layer for enforcing a bonding with the oxide film through degreasing and surface heating treatment, the reaction vessel is processed with pyrolysis reaction processing in the atmosphere containing water vapor, thereby the oxide film is formed at its surface, so that the bonding with the reaction vessel is more effectively improved. With such an arrangement as above, the bonding (bonding ability) of the oxide film against the reaction vessel is more effectively enforced and the reaction vessel having a high reliability with its durability being remarkably improved can be manufactured.

Accordingly, in accordance with the present invention, it provides the reaction vessel used in the equipment for oxidizing and decomposing with supercritical water and the method of manufacturing the reaction vessel in which corrosion resistance and durability are remarkably improved as compared with that of the prior art reaction vessel, the running cost accompanied by replacement or repairing or the like is substantially decreased, its continuous application can be carried out for a long period of time and it has a high practical effect.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed:

1. A reaction vessel suitable for oxidation and decomposition processing equipment for use with supercritical water, said vessel comprising a film covering the inner surface of said vessel, said film comprising a metal oxide, wherein said film has high corrosion resistance to oxidation and reduction.

2. The reaction vessel of claim 1, wherein said film comprises a platinum group metal oxide with a fine crystalline structure.

3. The reaction vessel of claim 2, wherein said platinum group metal oxide is selected from the group consisting of Ir, Ru or Rh oxide.

4. The reaction vessel of claim 1, wherein said film comprises a composite metal oxide comprising at least one platinum group metal oxide selected from the group consisting of Ir, Ru or Rh oxide.

5. The reaction vessel of claim 1, wherein said film comprises a composite metal oxide comprising at least one platinum group metal and at least one other metal selected from the group consisting of Ti or Ta.

6. The reaction vessel of claim 2, wherein said film comprises a composite metal oxide comprising at least one platinum group metal and at least one other metal selected from the group consisting of Ti or Ta.

7. The reaction vessel of claim 1, wherein said film comprises a composite metal oxide comprising Ir oxide, and from 20 to 50 atom percent of a metal selected from the group consisting of Ti or Ta.

8. The reaction vessel of claim 2, wherein said film comprises a composite metal oxide comprising Ir oxide, and from 20 to 50 atom percent of a metal selected from the group consisting of Ti or Ta.

9. The reaction vessel of claim 8, wherein said metal is Ta.

10. The reaction vessel of claim 1, wherein said film comprises a composite metal oxide comprising Ru oxide, and from 30 to 70 atom percent of a metal selected from the group consisting of Ti or Ta.

11. The reaction vessel of claim 10, wherein said metal is Ti.

12. The reaction vessel of claim 2, wherein said film comprises a composite metal oxide comprising Ru oxide, and from 30 to 70 atom percent of a metal selected from the group consisting of Ti or Ta.

* * * * *